US005864742A

United States Patent [19]
Gasper et al.

[11] Patent Number: 5,864,742
[45] Date of Patent: Jan. 26, 1999

[54] COPY RESTRICTIVE SYSTEM USING MICRODOTS TO RESTRICT COPYING OF COLOR-REVERSAL DOCUMENTS

[75] Inventors: John Gasper, Hilton; Jay Stuart Schildkraut, Rochester, both of N.Y.

[73] Assignee: Eastman Kodak Company, Rochester, N.Y.

[21] Appl. No.: 837,931

[22] Filed: Apr. 11, 1997

[51] Int. Cl.$^6$ .................................................. G03G 21/04
[52] U.S. Cl. ........................... 399/366; 283/93; 283/902; 382/165; 382/181
[58] Field of Search .............................. 399/366; 283/93, 283/114, 902; 382/165, 181, 190

[56] References Cited

U.S. PATENT DOCUMENTS

| | | | |
|---|---|---|---|
| 5,018,767 | 5/1991 | Wicker | 283/67 |
| 5,193,853 | 3/1993 | Wicker | 283/85 |
| 5,231,663 | 7/1993 | Earl et al. | 380/18 |
| 5,379,093 | 1/1995 | Hashimoto et al. | 399/366 |
| 5,390,003 | 2/1995 | Yamaguchi et al. | 399/366 |
| 5,412,718 | 5/1995 | Narasimhalu et al. | 380/4 |
| 5,434,649 | 7/1995 | Hasuo et al. | 399/366 |
| 5,444,779 | 8/1995 | Daniele | 380/3 |
| 5,481,334 | 1/1996 | Arimoto et al. | 399/366 |
| 5,515,451 | 5/1996 | Tsuji et al. | 382/165 X |
| 5,647,010 | 7/1997 | Okubo et al. | 283/902 X |

OTHER PUBLICATIONS

D. M. Zwick, "Journal of Applied Photographic Engineering," vol. 8, No. 2, Apr. 1982, pp. 71–76.

Heinrich Niemann, "Pattern Analysis and Understanding," Second Edition, 1990, p. 188.

William K. Pratt, "Digital Image Processing," Second Edition, 1991, pp. 613–614.

William H. Press, Saul A. Teukolsky, William T. Vetterling, and Brian P. Glannery, "Numerical Recipes in C, The Art of Scientific Computing," Second Edition, 1992, pp. 525–531.

J. Serra, "Image Analysis and Mathematical Morphology," vol. 1, 1990, pp. 424–445.

Joseph W. Goodman, "Introduction to Fourier Optics," 1968, pp. 176–183.

R. W. G. Hunt, "The Reproduction of Colour in Photography, Printing & Television," 1987, pp. 12–119.

"Research Disclosure," Sep. 1994, No. 365, pp. 501–541.

E. N. Willmer and W. D. Wright, "Nature—Colour Sensitivity of the Fovea Centralis," No. 3952, Jul. 28, 1945, pp. 119–121.

*Primary Examiner*—William Royer
*Attorney, Agent, or Firm*—Edward Dugas

[57] ABSTRACT

A system for restricting the copying of a color-reversal document having one or more microdots embedded in the color-reversal document. The system of detecting the presence of one or more of the embedded microdots and controllably disabling a copy machine to prevent it from copying the color-reversal document when at least one microdot is detected.

28 Claims, 4 Drawing Sheets

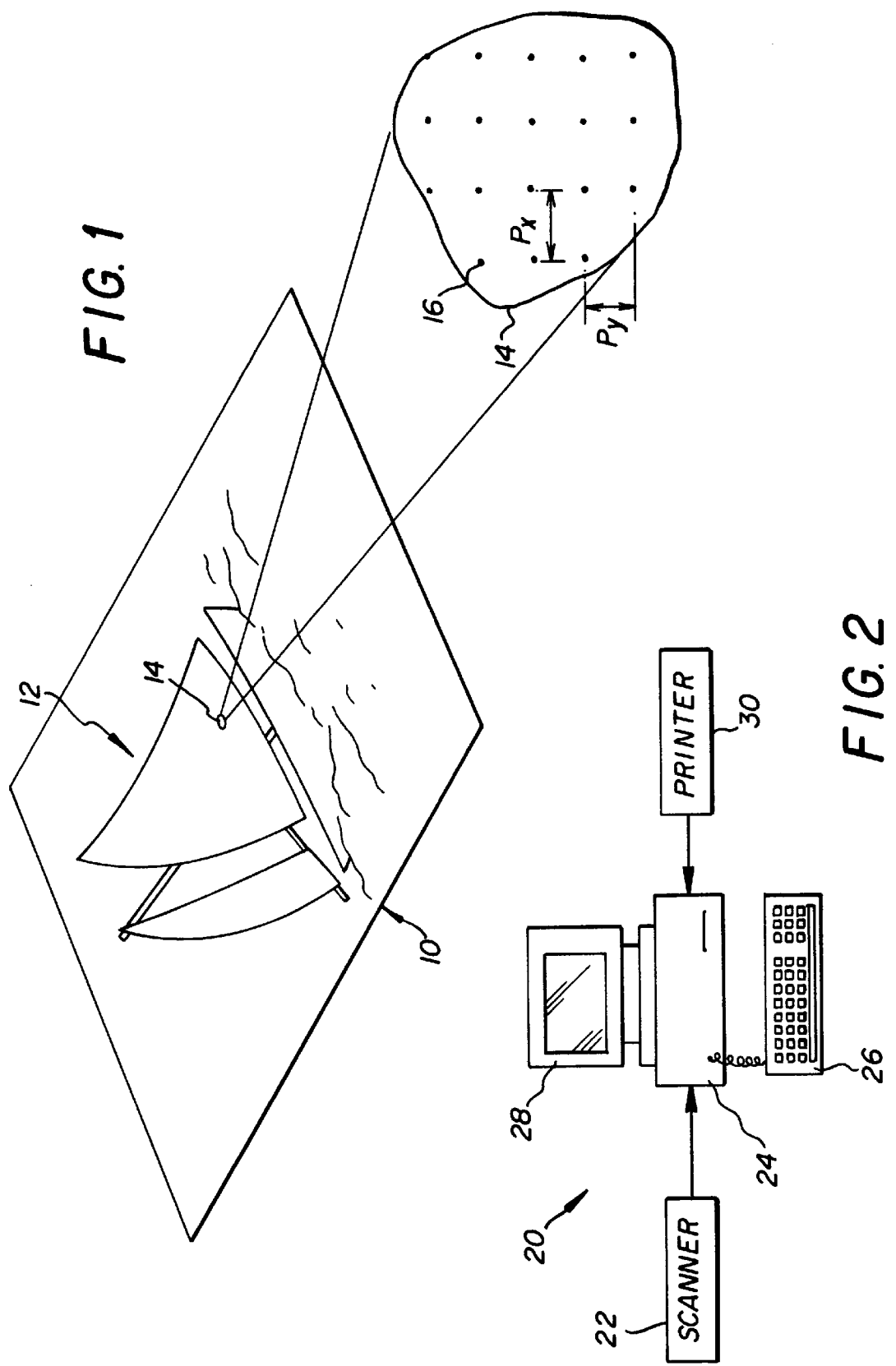

COPY RESTRICTIVE SYSTEM USING MICRODOTS TO RESTRICT COPYING OF COLOR-REVERSAL DOCUMENTS

CROSS-REFERENCE TO RELATED APPLICATIONS

The present application is related to U.S. application Ser. No. 60/004,404, filed Sep. 28, 1995, by Jay S. Schildkraut, et al., and entitled, "Copy Protection System;" U.S. application Ser. No. 08/598,785, filed Feb. 8, 1996, by John Gasper, et al., and entitled, "Copy Restrictive Documents;" U.S. application Ser. No. 08/598,778, filed Feb. 8, 1996, by John Gasper, et al., and entitled, "Copy Restrictive System;" U.S. application Ser. No. 08/598,446, filed Feb. 8, 1996, by Xin Wen, and entitled, "Copyright Protection In Color Thermal Prints;" U.S. application Ser. No. 08/835,976, by John Gasper, entitled "Copy Restrictive Color-Reversal Documents," and filed on even date with the present application, now issued as U.S. Pat. No. 5,772,250.

FIELD OF THE INVENTION

The invention relates generally to the field of copy restriction, and in particular to a technique for controlling or restricting the copying of copyright protected color-reversal documents.

BACKGROUND OF THE INVENTION

Copying of documents has been performed since the first recording of information in document form. Documents are produced using many procedures on many types of substrates incorporating many forms of information. Unauthorized copying of documents has also been occurring since the storage of information in document form first began. For much of the history of information documentation, the procedures used to copy original documents have been sufficiently cumbersome and costly to provide a significant impediment to unauthorized copying, thus limiting unauthorized copying to original documents of high value (e.g. currency, etc.). However, in more recent times the introduction of new technologies for generating reproductions of original documents (e.g. electrophotography, etc.) has decreased the cost and inconvenience of copying documents, thus increasing the need for an effective method of inhibiting unauthorized copying of a broader range of restricted documents. The inability of convenient, low-cost copying technologies to copy original documents containing color or continuous tone pictorial information restricted unauthorized copying primarily to black-and-white documents containing textual information and line art. Recently, the introduction of cost effective document scanning and digital methods of signal processing and document reproduction have extended the ability to produce low cost copies of original documents to documents containing color and high quality pictorial information. It is now possible to produce essentially indistinguishable copies of any type of document quickly, conveniently, and cost effectively. Accordingly, the problem of unauthorized copying of original documents has been extended from simple black-and-white text to color documents, documents containing pictorial images, and photographic images. In particular, restricting the unauthorized duplication of photographic images produced by professional photographers on digital copying devices has recently become of great interest.

U.S. Pat. Nos. 5,193,853 by Wicker and 5,018,767 by Wicker disclose methods for restricting the unauthorized copying of original documents on devices utilizing opto-electronic scanning by incorporating spatially regular lines into the original document. The spacings of the lineations incorporated in the original document are carefully selected to produce Moire patterns of low spatial frequency in the reproduced document allowing it to be easily distinguished from the original and degrading the usefulness of the reproduction. Although the Moiré patterns produced in the reproduced document are readily apparent to an observer, the required line pattern incorporated in the original document to produce the Moiré pattern upon copying is also apparent to an observer under normal conditions of use. Additionally, production of the Moiré pattern in the reproduced document requires that specific scanning pitches be employed by the copying device. Accordingly, this method of restricting unauthorized document copying is applicable only to documents such as currency or identification cards where the required line pattern can be incorporated without decreasing the usefulness of the document; application of this technique to high quality documents is unacceptable due to the degradation of quality and usefulness of the original document.

U.S. Pat. No. 5,444,779 by Daniele discloses a method of restricting a document from unauthorized copying by the printing of a two-dimensional encoded symbol in the original document. Upon scanning of the original document in an initial step of a copying process, the encoded symbol is detected in the digital representation of the original document and the copying process is either inhibited or allowed following billing of associated royalty fees. U.S. patent application Ser. No. 60/004,404, filed Sep. 28, 1995, by Schildkraut et al., and entitled, "Copy Protection System," discloses the incorporation of a symbol of a defined shape and color into a document followed by detection of the symbol in a scanned representation of the document produced by the copying device. In both disclosures, the incorporated symbol is detectable by an observer under normal conditions of use and readily defeated by cropping the symbol from the original document prior to copying. In addition, incorporation of the symbol into the document is required in the generation of the original document leading to undesired inconvenience and additional cost. Accordingly, these methods of imparting restriction from unauthorized copying are unacceptable.

U.S. Pat. No. 5,390,003 by Yamaguchi, et al., U.S. Pat. No. 5,379,093 by Hashimoto, et al., and U.S. Pat. No. 5,231,663 by Earl, et al. disclose methods of recognizing a copy restricted document by the scanning and analysis of some portion of the original document and comparison of the signal obtained with the signals stored in the copying device. When the signal of a copy restricted document is recognized, the copying process is inhibited. This method of restricting from the unauthorized copying of documents is limited in application because the signals of all documents to be copy restricted must be stored in or accessible by each copying device of interest. Because the number of potential documents to be copy restricted is extremely large and always increasing, it is impractical to maintain an updated signal database in the copying devices of interest.

Methods of encrypting a digital signal into a document produced by digital means have been disclosed. These methods introduce a signal which can be detected in a copying system utilizing document scanning and signal processing. These methods offer the advantage of not being detectable by an observer under normal conditions of use, thus maintaining the usefulness of high quality copy restricted documents. However, implementation of these methods is dependent on digital production of original documents. Although increasing, production of high quality documents using digital means is still limited. Accordingly, this approach is not useful for restricting the unauthorized copying of high quality documents produced using non-digital production methods.

U.S. Pat. No. 5,412,718 by Narasimhalu, et al. discloses the use of a key associated with the physical properties of the document substrate which is required to decode the encrypted document. This method of restricting the unauthorized copying of documents is unacceptable for applications of interest to the present invention because it requires encryption of the original document rendering it useless prior to decoding.

Finally, U.S. patent application Ser. No. 08/598,778, filed Feb. 8, 1996, by John Gasper, et al., and entitled, "Copy Restrictive System" and U.S. patent application Ser. No. 08/598,785, also filed on Feb. 8, 1996, by John Gasper, et al., and entitled, "Copy Restrictive Documents" disclose pre-exposing color photographic paper to spots of blue light to produce an array of yellow microdots after chemical processing and a method of detecting these microdots during scanning performed by a digital printing device. Color photographic paper capable of forming yellow microdots after exposure to spots of blue light is of the color-negative type.

SUMMARY OF THE INVENTION

The present invention is directed to overcoming one or more of the problems set forth above. Briefly summarized, according to one aspect of the present invention, there is provided a system for restricting the copying of a copy-restricted document comprising means for embedding one or more microdots into a copy-restricted document; detecting means for detecting the presence of one or more microdots in said copy-restricted document; and controlling means responsive to said detecting means for restricting a copy machine from copying the copy-restricted document when a microdot is detected.

The primary object of the present invention is to provide color-reversal documents with copy restriction that can be implemented without degrading the quality of the original.

An additional object of the present invention is to provide a copy restricted document that incorporates a plurality of prescribed microdots in the chemically processed document detectable by an opto-electronic scanning device only within a limited range of optical densities.

Another object of the present invention is to provide a method of copy restriction that does not require the production of the original document using digital techniques.

Yet another object of the present invention is to provide a copy restriction method that incorporates a plurality of prescribed microdots in the document to be restricted that are not visible under normal viewing conditions.

Another object of the present invention is to provide a copy restricted document that incorporates a plurality of prescribed microdots that are not present in the chemically processed document in the areas of the image of minimal optical density.

Still another object of the present invention is the assignment of a unique pattern to the plurality of microdots.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

This technique of copy restriction has several positive features. The microdot pattern incorporated into the original document is not detectable by the user under routine conditions of document viewing allowing it to be used in high quality documents for most applications without any detectable degradation in usefulness. The microdot pattern can be employed throughout the document increasing the robustness of detection while simultaneously making it impossible to crop out of the document. Additionally, because the pattern is substantially invisible, authorized copying of the original document results in reproductions of high quality and utility. Implementation of the inventive method of copy restriction represents a low-cost solution to manufacturers of copying devices incorporating opto-electronic scanning devices and digital signal processing since no new equipment is required. The ability to incorporate the microdot pattern into the document medium during its manufacture makes it simple and cost effective for the producer of the original document to implement.

BRIEF DESCRIPTION OF THE DRAWINGS

FIG. 1 is a perspective of a print incorporating the microdots of the present invention with an enlarged projection of a portion of the print to visually present the microdots;

FIG. 2 illustrates in block diagram form a system in which the present method may be incorporated;

To facilitate understanding, identical reference numerals have been used, where possible, to designate identical elements that are common to the figures.

DETAILED DESCRIPTION OF THE INVENTION

Figure 3:
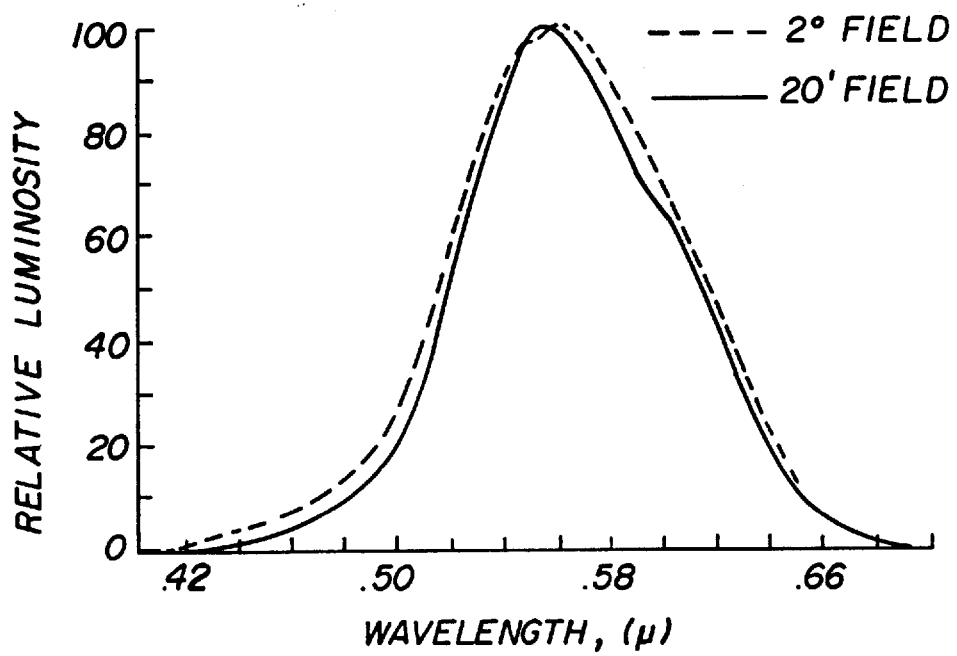
FIG. 3 is a graph illustrating the photopic luminosity functions of the human eye for two fields of centrally fixated viewing.

Referring to FIG. 1, in its most general implementation, the inventive method to impart copy restriction to hard copy information-bearing documents incorporates a pattern of microdots 16 into an image 12 on an original document 10. The pattern is enlarged for the reader's ease of viewing in window 14, but normally is not easily detectable by visual examination of the image 12. As can be seen the x and y spacings between microdots are denoted by $P_x$ and $P_y$, respectively.

FIG. 2 is a sketch of a typical copy print station 20. In a classical copy situation the original document 10 is placed on a scanner 22 to provide a digitized sequence of signals to a computer 24. The computer 24 utilizes a keyboard 26, mouse, or touch screen for operator interaction with the computer 24 and a monitor 28 for viewing the scanned image. A printer 30 is attached to the computer 24 directly or via a communication link to enable the formation of hard copy prints. An algorithm, residing in computer 24, detects the presence of any pattern of microdots 16 in the original document 10, and automatically deactivates the printer 30 to abort the document copying process thereby restricting the unauthorized copying of the original document 10.

For the purpose of this disclosure, "hard copy, information bearing documents" (henceforth referred to as "documents") is meant to refer to any type of direct reversal photographic media capable of recording a positive image by means of contact, lens projection, or optical scanning exposure. Examples of direct reversal photographic media are color-reversal film and color-reversal paper. The media comprising the document may be principally light reflective, transmissive, or translucent. In this disclosure, "information" is meant to refer to any form of information that is visible to an observer. Typical information is either pictorial or graphical in form including, but is not limited to, text, sketches, graphs, computer graphics, pictorial images, paintings, and other forms of two-dimensional art. "Original" in this disclosure is meant to refer to the document that is scanned in an initial step of the copying process. "Copy" means a reproduction, likeness, duplication, imitation, and/or semblance that may be magnified or demagnified, in whole or in part, in the form of a print, display, digital image file, depiction, or representation. "Scanning" is meant to refer to any opto-electronic means of measuring the absorptance (by means of reflection or transmission optical density or the reflectance or transmittance) as a function of distance in the original document, and converting the measured signals into corresponding electronic signals. Copy "restriction" means prevention of copying by mechanical, electrical, optical, or other means including the degradation of the usefulness of any copied image as well as controlled enabling of document reproduction with proper authorization.

In the preferred embodiment of the invention, the microdot pattern is incorporated throughout the document to be restricted from unauthorized copying. Microdot placement at all locations within the document insures that the pattern will exist in at least one important area of the document making it impossible to remove the pattern by physical cropping without significantly decreasing the usefulness of any reproduced document. In another preferred form of the invention the microdot pattern is incorporated into the document in a preselected location or locations not covering the entire document.

In the practice of the invention, the incorporated microdots can take any of a variety of forms as long as they satisfy the requirements of being substantially undetected by casual observation under normal conditions of document use and do not decrease the usefulness of the original document. "Casual observation" is meant to refer to observation of the document under conditions relevant to the normal use of the document including the conditions of viewing and illumination. In particular, viewing distances will conform to those for typical utilization of the original document without the use of special image modifying devices (e.g. magnifying optics, colored filters, etc.), and illumination will conform to typical levels of illumination using illumination sources of typical color temperature. "Detection by casual observation" means discrimination of the individual microdots of the incorporated microdot pattern or a perceived change in the optical density, either neutral or colored, of the document.

The invention is implemented using microdots of any regular or irregular shape. In the case of non-circular microdots, the orientation of the microdots can be selected to lie along any angle between 0 and 360 degrees relative to the horizontal axis of the information bearing document as normally viewed. In one embodiment of the invention, the microdots are square in shape. In another embodiment, the microdots are circular in shape and in another embodiment the microdots are elliptical in shape.

In practicing the invention the size of the microdots is chosen to be smaller than the maximum size at which individual microdots are perceived sufficiently to decrease the usefulness of the document when viewed under normal conditions of usage. The minimum size of individual microdots is chosen to be greater than or equal to the size at which the microdot pattern can be reasonably detected by the document scanning device of interest. A useful measure of the size of the microdots is to specify the area of an individual microdot as the diameter of a microdot having a circular shape of equivalent area (henceforth referred to as the equivalent circular diameter, ECD). In situations where the edge of a microdot is not sharply defined, the edge is taken to be the isodensity profile at which the optical density of, for example a minus-yellow microdot, is midway between the minimum yellow density of the microdot and the yellow density of the region adjacent to the microdot,. In the preferred embodiment of the invention, microdots of an ECD of less than or equal to 300 microns are utilized. The ECD of the microdots preferably is greater than or equal to 10 microns, and most preferably greater than or equal to 50 microns.

One embodiment of the invention incorporates the microdots in a periodic pattern, although it is contemplated that the invention can be practiced with microdots aperiodically dispersed in the document. Periodic patterns of microdots, useful in the practice of the invention, can take on any periodic spatial arrangement. One embodiment of the invention places the microdots in a rectangular array. Another embodiment of the invention places the microdots in a hexagonal array. The center-to-center (defined as the distance between the centroids of two adjacent microdots) spacing of the microdots is chosen to be any distance greater than or equal to the minimum distance at which an increase in document density occurs which is observed by casual observation to decrease the usefulness of the original document. In one form of the invention, the spacing of the microdots is greater than or equal to 0.5 mm. The robustness of microdot detection in the document's representative digital signal increases with an increase in the number of microdots present in the document. Although it is possible to practice the invention with any microdot spacing which exceeds the minimum spacing for the detection of an unwanted increase in density, a preferred version of the invention incorporates microdots with a spacing similar to the minimum allowable spacing as described above. Another method of practicing the invention utilizes a microdot pattern in which the center-to-center spacing of the microdots is less than 10 mm.

Microdots useful in the practice of the invention can be of any brightness, hue, and saturation which does not lead to sufficient detection by casual observation to reduce the usefulness of the original document. To minimize the detectability of individual microdots, it is preferable to select the hue of the microdots to be from the range of hues that are least readily resolvable by the human visual system. It is also preferable to select the hue of the microdots for minimum visibility under conditions of maximum visual contrast to their surroundings. When incorporated into photographic prints with images typical of professional photographers, it has been found that the areas of most critical interest to the photographer for observing the presence of microdots are the areas of low reflection density and most critically white areas.

In the embodiment of the present invention, however, there are no visible or scanner detectable microdots in the areas of minimum reflection density, generally referred to as the highlight areas of the image. In the highlight areas of the scene where there is high image exposure of the color-reversal paper, the image exposure overwhelms the microdot exposure so the image of the microdot is effectively bleached to become both invisible to the human eye and undetectable by an optical scanner. So when employing color-reversal paper there are no visible or scanner detectable microdots in the highlight or minimum density areas of the photographic print. Consequently we must set a different criterion for maximum visibility of the microdots. It has been reported that the range of reflection densities of most critical interest to the photographer for observing the graininess of Kodacolor 400™ color-negative film printed onto Kodak Ektacolor 78™ color-negative paper are the mid-density values of about 0.8 to 1.2 (see FIG. 12 in Journal of Applied Photographic Engineering, D. M. Zwick, p. 71, vol.8(2), April, 1982). Observations of color-reversal prints with minus-yellow microdots confirms that these microdots are most detectable in this same range of reflection densities. In the shadow areas of high reflection density (low reflectance) the presence of a microdot results in only a very small decrease of reflection density and a correspondingly very small increase in brightness in a particular color record. This incremental brightness increase caused by the microdot in a dark area of the image is so low that the human visual system cannot detect the microdot.

In the embodiments of the present invention the objective is to select the hue of the microdots from the range of hues that are least readily resolvable by the human visual system when viewed against a gray background of reflection density between 0.8 and 1.2. It is understood that in any small area of the image that is colored, the apparent color of the microdots is modified by the additional absorption of the image so as to appear a different color. For example, minus-yellow microdots present in a yellow area of the image will appear (depending on the level of their exposure) less yellow or white and in a neutral gray area of the image they will appear blue under magnification.

An objective of this invention is to select the hue of the microdots from the range of hues that are least readily resolvable by the human visual system when viewed against a background of mid-range reflection densities. At the same time, the hue of the microdots useful in the practice of the invention must also be selected to conform to the sensitivities of the anticipated document scanning device to optimize detection of the microdot pattern in the document representative digital signals.

Figure 4:
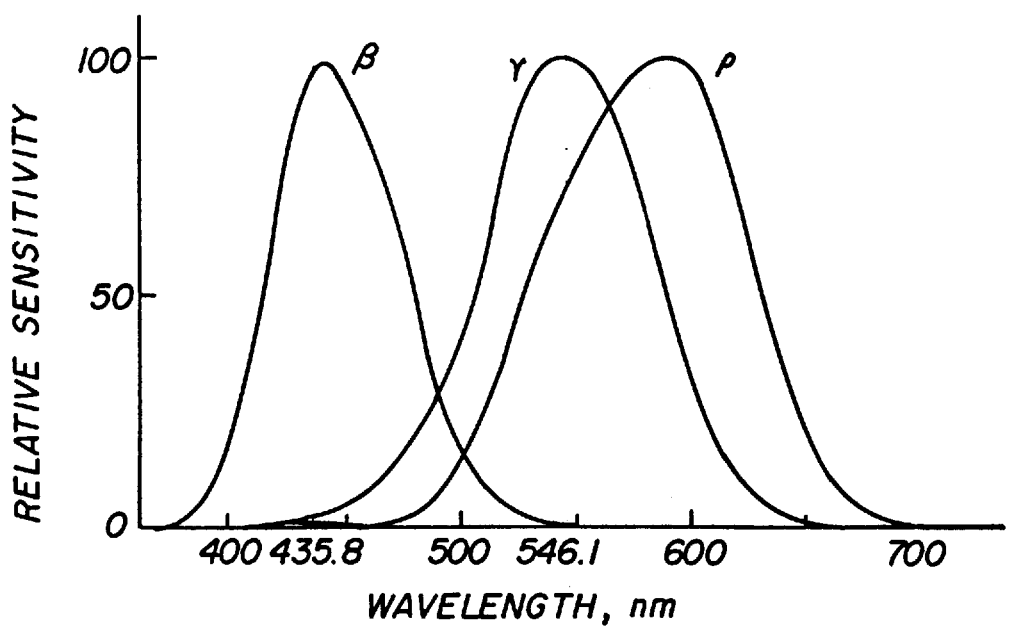
FIG. 4 is a graph illustrating trichromatic sensitivities.

FIG. 3 shows the centrally fixated luminosity response for a typical observer for two different fields of view (see "NATURE," p119, vol. 156, 1945). The dashed curve is for a 2 degree and the solid curve is for a 20 arcminute field of view. The field of view for microdots of dimensions useful in the practice of this invention is approximately 0.02 degrees or 1.2 arcminutes It is specifically contemplated that the practice of this invention will be useful in the restriction of unauthorized copying of documents on copying devices designed to produce reproductions of the original document that are visually indistinguishable from the original as seen by an observer. The sensitivity of devices of this type is typically chosen to closely approximate the sensitivities of the human visual system as shown in FIG. 4 (see "THE REPRODUCTION OF COLOUR IN PHOTOGRAPHY, PRINTING, & TELEVISION," by R. W. G. Hunt, Fountain Press, 1987, page 13).

Accordingly, the invention incorporates microdots that are substantially minus-yellow in hue when viewed against a yellow background. Selection of minus-yellow hue will simultaneously satisfy the requirements of being least sensitive to detection by an observer, but readily detectable by a copying device. Accordingly, the most preferred method of practicing this invention is to select the hue of the microdots such that their diminished spectral reflection density (density below that of a neutral background) falls substantially in the wavelength region less than 500 nm. "Substantially," as used in this disclosure, means that at least 75% of the integrated area under a plot of diminished spectral reflection density versus wavelength between the limits of 400 nm and 700 nm falls within the specified region. The diminished yellow density and increased blue reflectance provided by the minus-yellow microdots is sufficient to allow detection by the document copier, but is insufficient to render the microdots perceptible. For systems in which the opto-electronic scanning device has spectral sensitivities which depart from the normal sensitivities of the human visual sensitivities, the hue of the microdots is preferably shifted in a similar manner.

A preferred practice of the invention incorporates the microdot pattern in the produced original document during the manufacture of the photographic medium. In an alternative form of the invention, the microdot pattern can be incorporated into the document after distribution and before recording the document information onto the medium. In yet another form of the invention, the microdot pattern can be incorporated into the document after distribution and after recording the document information onto the medium.

It is specifically anticipated that the practice of the invention is particularly useful in restricting photographic images from unrestricted copying on copying devices utilizing opto-electronic scanning devices. As described above, the microdot pattern can be incorporated into the photographic medium prior to production of the photographic image, following production of the photographic image, or incorporated into a digital image prior to printing using a digital printing technology. Reflective and transmissive photographic supports, substrates, or bases are contemplated in the practice of the invention.

It is specifically contemplated that color-reversal image-forming photographic media are useful in the practice of the invention. Accordingly, photographic media contemplated in the practice of the invention will contain at least one silver halide light sensitive unit sensitive to at least one region of the ultraviolet, visible, and/or infrared spectrum. It is common to have silver halide light sensitive units contain more than one silver halide containing layer sensitive to the same region of the ultraviolet, visible, and/or infrared spectrum. Color recording photographic media typically contain three silver halide light sensitive units each recording light from one of the red, green, and blue regions of the spectrum. The silver halide light sensitive layers contain color-forming precursors. The order of the light sensitive layers containing silver halide may take on any of the forms known to one skilled in the art of silver halide media design. Technologies relevant to the design and production of photographic media can be found in Research Disclosure Number 365, September 1994.

In one embodiment of the invention, the minus-yellow microdot pattern is added to the photographic medium (by a controlled blue light exposure using a microdot pattern contact mask) prior to or following photographic recording of the image. Microdot pattern masks useful in the practice of this form of the invention can be prepared using typical photographic means. One such means photographs a black microdot pattern on a white background with high contrast lithographic film. The size and spacing of the microdot pattern to be photographed in combination with the magnification of the camera's optical system are chosen to give a photographic film image of the correct physical dimensions.

Photographic processing of the lithographic film results in a final mask of clear microdots on a black background. A more preferred means of producing the microdot contact mask is to generate a digital image of the desired microdot pattern followed by the use of a digital graphic arts imagesetter to write the digital image onto lithographic film. The polarity of the digital image can be inverted in the computer so that a single photographic writing and processing step results in the desired microdot contact mask.

Exposure of the microdot pattern onto the photographic medium can be accomplished at any time following coating of the photosensitive materials onto the photographic support, prior to photographic processing of the photographic medium. Accordingly, it is contemplated that the microdot exposure in the preferred form of the invention would occur during manufacturing of the photographic medium. Exposure of the microdot pattern onto the photographic medium could occur prior to or following cutting of the photographic medium into its final form. It is also contemplated in another form of the invention that the microdot pattern will be exposed onto the photographic medium immediately prior to or following exposure of the photographic medium to the photographic image to be recorded. Another arrangement of the invention exposes the microdot pattern onto the reversal photographic medium immediately prior to photographic chemical processing.

Photographic formation of the microdot pattern can occur in one of the image-forming layers present in the photographic medium used for forming the photographic image. In the preferred practice of the invention the microdot pattern is formed by selective blue light exposure of the yellow image-forming layer of the photographic medium to the microdot pattern resulting in microdots of minus-yellow hue after photographic processing. Selective exposure is accomplished by selecting monochromatic blue light sources or by adjusting the photographic printing light source (e.g. by spectral filtration) to include only those wavelengths of light to which the yellow image-forming light sensitive silver halide-containing layers of the photographic medium are preferentially sensitive. The intensity of the microdot exposure is also adjusted such that appropriate diminished density is formed in the yellow image-forming layer while minimizing the formation of diminished density in the remaining image-forming layers.

Methods of exposing the microdot pattern onto reversal photographic media include contact or projection printers, scanning printers such as CRTs and laser printing devices, and arrays of illumination sources including laser diodes and light-emitting diodes with appropriate focusing optics such as Selfoc® lens arrays.

For documents produced using digital means the microdot pattern is incorporated into the digital representation of the document prior to production of the original document. In this implementation, picture elements (pixels) of the digital representation of the document corresponding to the location of the desired microdot pattern are adjusted in pixel value to produce microdots having the desired absorptance in the produced original document. Application of this approach is specifically contemplated for color documents where the pixel values corresponding to the microdot pattern are adjusted to produce a measurable amount of diminished yellow dye formation while the amounts of cyan and magenta dye formed remain essentially unchanged from the digital representation of the document.

The original document containing the microdot pattern is scanned with an opto-electronic scanning device associated with a copying device. The opto-electronic scanning device can be the same scanning device used for copying the original document or alternatively one may utilize a scanning device intended solely for analysis of the original document to be copied. Another embodiment of the invention utilizes an opto-electronic scanning device and a digital image processing unit to detect the presence of the microdot pattern. The detecting unit controls the operation of a copying device which in general does not rely on opto-electronic scanning techniques to produce a reproduction of the original document. Practice of the invention with a digital copying system, incorporating an opto-electronic scanning device, utilizes a sub-sampled set of data obtained from the scanning of the original copy restrictive document to detect any present microdots. Alternately a digital copying system may pre-scan the original document at a relatively low resolution for the purpose of previewing the original document and quickly detecting the presence of any microdot pattern. If a microdot pattern is not detected, a second scan at a higher resolution is performed for the purpose of document reproduction. The design of the opto-electronic scanning device is selected from any of the designs known to those skilled in the art of scanner design. A scanning device that utilizes a separate opto-electronic sensor and or illumination source conforming to the spectral properties of the microdot pattern is preferred.

The resolution of the opto-electronic scanning device is chosen to distinguish the microdots from the surrounding document area. For the practice of the invention, a scanning resolution equal to or greater than 75 dots per inch (dpi) is acceptable. More preferred is a scanning resolution greater than or equal to 150 dpi, and most preferred is a scanning resolution greater than or equal to 200 dpi.

Scanning a document with the opto-electronic scanning device produces electronic signals representing optical absorptance or optical density of the document on a pixel-by-pixel basis. The electronic signals are generally converted into a digital image prior to subsequent electronic processing to permit detection of the presence of a microdot pattern in the document.

The presence of microdots can be ascertained by an examination of the digital image in a variety of ways. The number of microdots in the image may be counted by determining the number of regions of the digital image with code values and of a size and shape that are indicative of a microdot. Alternatively, the presence of the spatial pattern of the microdots in the digital image may be detected by means of image processing such as described in "DIGITAL IMAGE PROCESSING," 2nd Edition, William K. Pratt, Sun Microsystems, Inc., Mountain View, Calif., 1991 by John Wiley & Sons, Inc. (1991), pages 613–614.

Prior to the analysis of the digital representation of the original document for the purpose of detecting the presence of the micro dot pattern, transformation of the digital image into other metrics is preferred. One such transformation that is anticipated is to convert R, G, and B density representative signals into corresponding $L^*$ $a^*$ $b^*$ representative signals (see "THE REPRODUCTION OF COLOUR IN PHOTOGRAPHY, PRINTING, & TELEVISION," by R. W. G. Hunt, Fountain Press, 1987, page 118). Other color space transformations are also anticipated as being useful in the practice of this invention.

Detection of micro dots in the digital representation of the document is conducted throughout the entire image. As previously stated the full image can be segmented into sub-sections. The average color of each sub-section may be determined and those sections having average colors which favor the presence of microdots can be preferentially evaluated. Sub-sections which provide a strong signal of the presence of microdots are recognized as being preferred for their detection.

The apparent color of a micro dot in the image can be affected by the colors of the image surrounding the microdot and by the optical characteristics of the scanning device. To facilitate detection of the microdots it is best to adjust the threshold of color expectation to the average color of the area of the document being evaluated. The color expectation for a microdot in any medium, as seen by any opto-electronic scanning device, can be determined empirically.

A Fourier transform can be performed on the section or sub-section of the digital representation of the original document after the determination of those pixels which represent microdots. The obtained two-dimensional frequency spectrum can then be evaluated at those frequencies anticipated for periodic patterns.

Direct optical detection of microdots can take the form of the measurement of the optical reflection or transmission of light by the document with a spatial resolution sufficient to resolve a microdot. Another method of direct optical detection of microdots is by the use of an optical correlator. Optical correlators are discussed in "INTRODUCTION TO FOURIER OPTICS" by Joseph W. Goodman, McGraw-Hill (1968), pages 177–182.

The copying process is allowed to continue unrestricted if the presence of the microdot pattern is not detected in the original document. If the microdot pattern, indicative of a copy restricted document, is detected, a signal indicating the detection of a copy restricted document is turned on and the copying process is halted by the controlling software of the copying device. In one implementation of the invention, after detection of the microdot pattern, the copying process is re-initialized for the next original document. In an alternate method of practicing the invention, the copying system is disabled until an authorized operator intervenes. The authorized operator may re-enable the copying process if authorization to copy is produced, or the copying device is re-initialized without producing a copy if no authorization is available.

In another embodiment of the invention minus-yellow microdots are incorporated into nonrestricted or copy restricted documents for the purpose of providing document scaling and rotation information. A periodic pattern of minus-yellow microdots without rotational symmetry such as a rectangular pattern can be employed with specific values of $P_x$ and $P_y$ (see FIG. 1). The document copier can detect the minus-yellow microdots and determine the angle at which the document has been placed on the platen of the copier. If the angle is beyond a set limit, a message may be displayed to straighten the document on the platen before making a copy. If the detected angle is below this set limit, software in the copier may be employed to remove the image rotation in the copied image. In addition, if the spacings of minus-yellow microdots are detected to be different than $P_x$ and $P_y$ by a constant scaling factor, then an algorithm in the copier can determine if the image in the document on the platen has been magnified or demagnified. If the copier determines that the image has been magnified from its original size, the copier may employ an image enhancement algorithm to improve the sharpness or acutance of the copied image.

In another embodiment of the invention a unique pattern of minus-yellow microdots is incorporated into a copy restricted color-reversal document for the purpose of providing information about its manufacture, distribution, or sale. The unique pattern of minus-yellow microdots can be created in a great number of ways, such as omitting microdots in specific locations of the pattern, adding extra microdots in specific locations of the pattern, or by changing the spatial frequency of the pattern in one or more directions for a specific number of microdots.

EXAMPLES

Example 1

Example 1 is an implementation of the invention in a photographic image. The goal is to incorporate imperceptible microdots into an image on reversal photographic paper and then to scan the image and detect the presence of the microdots by analyzing the digitized image.

The first step is to make a mask through which photographic paper may be exposed in order to place microdots in the paper. An imagesetter is set to a resolution of 635 dpi. An 8"×10" Eastman Kodak Kodalith™ film mask is made that consists of a rectangular (almost square) periodic array of transparent square microdots of 100 micron width and height and a center-to-center spacing of about 3.2 mm. The area of the mask between the microdots is black.

Next, a colorpatch print is made as follows: An image that consisted of 512 color patches in Eastman Kodak Ektachrome™ transparency film was contact exposed to Eastman Kodak Ektachrome Radiance III™ color-reversal photographic paper with a Berkey Omega™ D5500 color enlarger with a Chromega D Dichroic II Lamphouse™ and Schneider-Kreuznack Componon-S™ 2.8/50 lens as a distant point source of uniform exposure. The emulsion of the Kodalith™ mask was held in a spring-loaded contact printing frame in contact with the emulsion of the photographic paper at the easel of the enlarger. The lens was set at f/11 and was located 38 inches above the paper. The dichroic settings were 5 cyan, 6 magenta, and 0 yellow. The exposure was of 16 seconds duration at high intensity setting. These settings resulted in a neutral balance of the neutral step tablet in the Ektachrome™ colorpatch. After the paper was first exposed as just described it was then contact exposed with blue light through the Kodalith™ mask. The mask exposure was done using the same enlarger as a point light source with identical settings except that the lens was set at f/5.6, the dichroics were set at maximum filtration of green and red light (0 yellow, 151 magenta, and 151 cyan), and a Wratten™ 47B was also placed in the film gate of the enlarger for additional filtration of green and red light, and an exposure time of 14 seconds provided the calibration test chart. Finally, the exposed photographic paper was chemically processed using a Colenta™ R3 Color-Reversal Paper Processor.

To demonstrate the detection of the microdots in a photographic print we printed an image (referred to as the Heirloom Scene) recorded in 35 mm Eastman Kodak 5005 EPP Reversal Film™ onto Eastman Kodak Ektachrome Radiance III™ color-reversal photographic paper using a second Super Chromega™ enlarger with a Rodenstock Rodagon™ 5.6/80 lens. The lens was set at f/16 and the dichroics were set at 12 cyan, 9 magenta, and 0 yellow. The 35 mm frame was enlarged to 8"×10" and the exposure time was 5.0 seconds at low intensity. The microdots were then exposed using the first enlarger as a point source of blue light with the same exposure conditions and Eastman Kodak Kodalith™ mask in the contact printing frame as previously described above except exposures were made over a wider range of 7, 10, 14, and 30 seconds. The exposed photographic paper was chemically processed using a Colenta™ R3 Color-Reversal Paper Processor.

Figure 5:
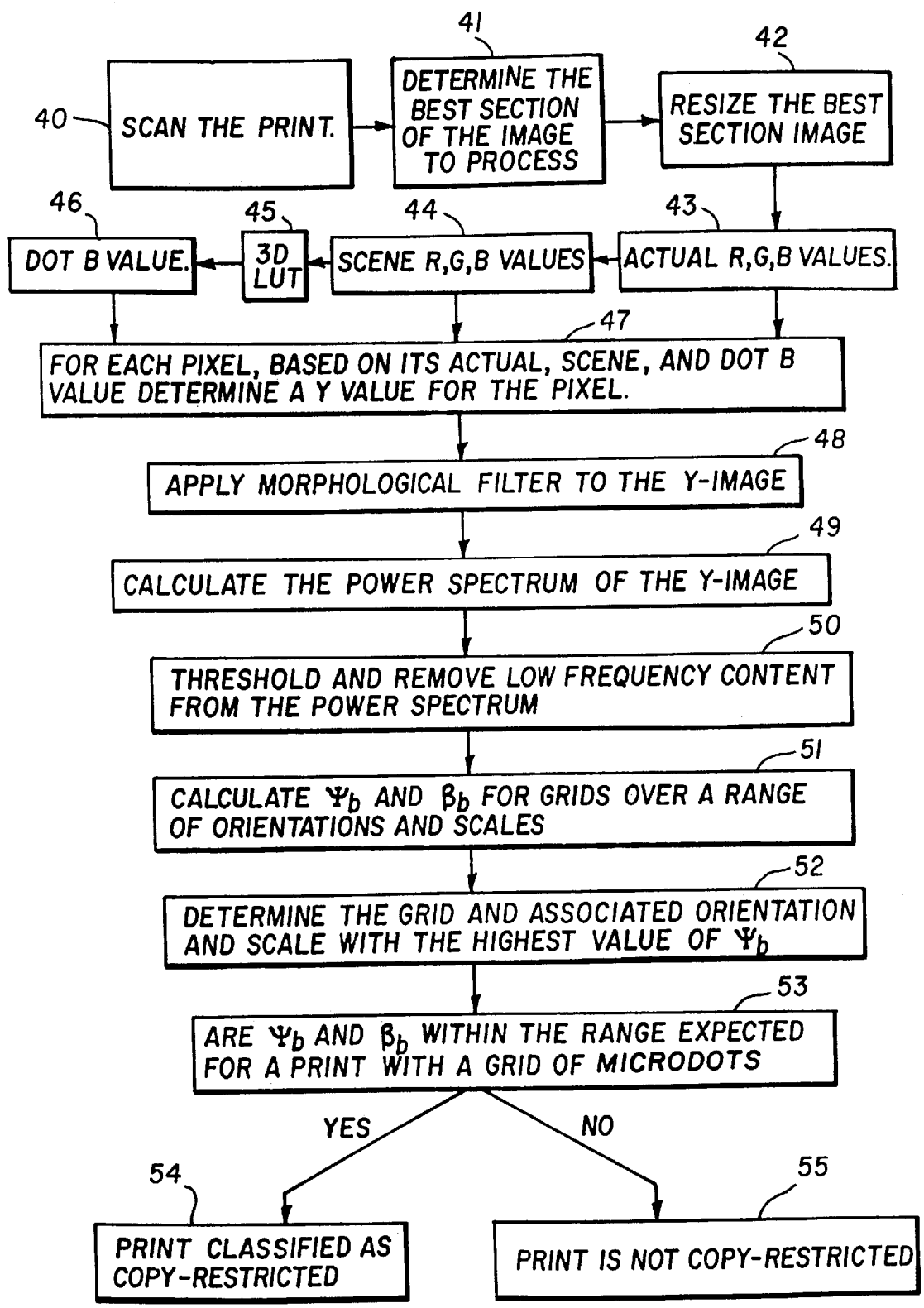
FIG. 5 is a flowchart of one form of a microdot copyright detection algorithm.

Referring to FIG. 5 we describe the steps that are required to automatically detect the microdots in the photographic print. First, the print is scanned, step 40, by an Epson™ ES800C flat bed scanner at a resolution of 200 dpi. In the next step 41, the 256×256 pixel section of the digital image with mean blue code value closest to 100 (from a range of 0 to 255) was chosen for further processing. This criteria was used because the minus-yellow microdots are most detectable in the midtone range of the blue band. If the image had been scanned at a higher resolution than 200 dpi, for instance, at 400 dpi in step 41, a 512×512 pixel section would have been chosen and in step 42 the section would have been resized to 256×256. This is done so that the processing speed of subsequent steps are independent of the resolution at which the print is scanned.

For each pixel in the 256×256 pixel sub-image we calculate a quantity Y (step 47) which is given by $$Y=255[1-|b_a-b_d|/|b_s-b_d|]\ |b_s-b_d|\geq C$$

$$Y=0 \quad |b_s-b_d|<C \qquad \text{Equation (1)}$$

where $b_a$ is the blue code value of the pixel in step 43, $b_s$ is the blue code value of the pixel after a 5×5 median filter has been applied in step 44, and in step 46 $b_d$ is the blue code value of a pixel that contains a minus-yellow microdot. The value of $b_d$ is dependent on the background color at which the microdot occurs. By scanning the colorpatch print described previously, a 3D look-up-table (LUT) was made that gives the value of $b_d$ for any background color. In order to obtain $b_d$ while processing an image a 5×5 median filter is used to estimate the red, green, and blue background code values. These values are used as input to the 3D look-up-table in step 45 to obtain $b_d$. Finally, the value of C in Equation (1) is seven.

Figure 6:
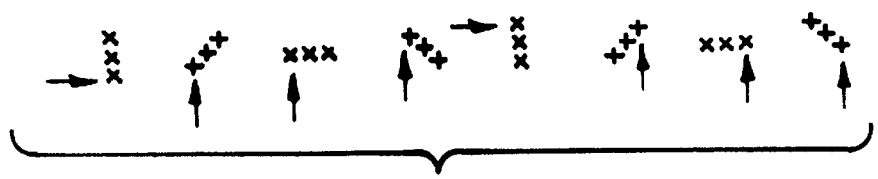
FIG. 6 is a drawing of eight morphological filters.

The result of step 47 is a 256×256 pixel image, which we refer to as the Y-image that retains the image of the minus-yellow microdots, but removes the content of the scene that is printed on the paper. Because some image content still remains in the Y-image we apply in step 48 a morphological filter to the image that attenuates all structures in the image other than single pixel dots. This is accomplished with the series of eight morphological filters shown in FIG. 6 where the arrow denotes the origin of the filter. (See *Image Analysis and Mathematical Morphology Volume* 1, by Serra, Academic Press (1982), pages 424–445.) Each operator is placed so that the origin is located at pixel p and line l of the Y-image and the minimum code value is found according to the equation $$V_i(p,l)=\text{Min}(Y(p',l'))\ p',l'\epsilon O_i \qquad \text{Equation (2)}$$

where $O_i$ is the i'th filter. Next, the maximum value of all the $V_i$, $V_{max}$, is calculated.

$$V_{max}(p,l)=\text{Max}(V_i(p,l)) \qquad \text{Equation (3)}$$

Finally, the filtered Y-image is set equal to the difference between the Y-image and $V_{max}$ $$Y_{filtered}(p,l)=Y(p,l)-V_{max}(p,l) \qquad \text{Equation (4)}$$

In the next step 49 the discrete Fourier transform of the Y-image is calculated with a fast Fourier transform algorithm. (See Press, et al., *Numerical Recipes in C, Second Edition*, Cambridge University Press, 1992, p. 525.) The square of the magnitude of the Fourier transform for frequencies between the Nyquist frequencies are stored in a two-dimensional array of real numbers. This array is referred to as the power-spectrum. The power-spectrum usually consists of an array of peaks arising from the grid of minus-yellow microdots if it is present, periodic scene content that was passed into the Y-image, and perhaps periodic texture of the paper. In addition to this there may be low amplitude contributions to the power-spectrum due to non-periodic scene content and paper texture that also contributes to the Y-image. Before we go to the next step of determining whether peaks in the power-spectrum are indicative of the grid of minus-yellow microdots we attempt to remove this low-level power and set to zero the region of the power-spectrum that cannot contain contributions from the microdots (step 50).

Low amplitude power is removed from the power-spectrum by thresholding it according to the following equation $$\text{if } \{\|H(f_x,f_y)\|^2<T_{min}\}\ H(f_x,f_y)=0 \qquad \text{Equation (5)}$$

where $T_{min}$ is set to 0.06.

All power is removed from the power-spectrum at frequencies that are too low to contain a contribution from the microdots.

This is explicitly stated as follows:

$$\text{if } \{f_x \& f_y \leq f_{cutout}\}\ H(f_x,f_y)=0 \qquad \text{Equation (6)}$$

where $f_{cutout}$ equals 5.0.

At this point in the processing chain we have a power-spectrum in which some frequencies may have power concentrated in them. The problem now is to determine if these peaks, if they exist, are the signature of the microdots in the frequency domain for a range of orientation and microdot spacing. The method used to detect this grid is related to the Hough transform (Pratt, *Digital Image Processing, Second Edition*, John Wiley and Sons, New York, 1991, p. 613–614) which is used to detect lines in an image. The Hough transform may be generalized as a method of accumulating evidence for the existence of a parametrized curve in an image by calculating within limits all possible values of the parameters for each pixel in the image with a sufficiently high code value (Nieman, *Pattern Analysis and Understanding, Second Edition*, Springer-Verlag, Berlin, 1990, p. 188).

Figure 7:
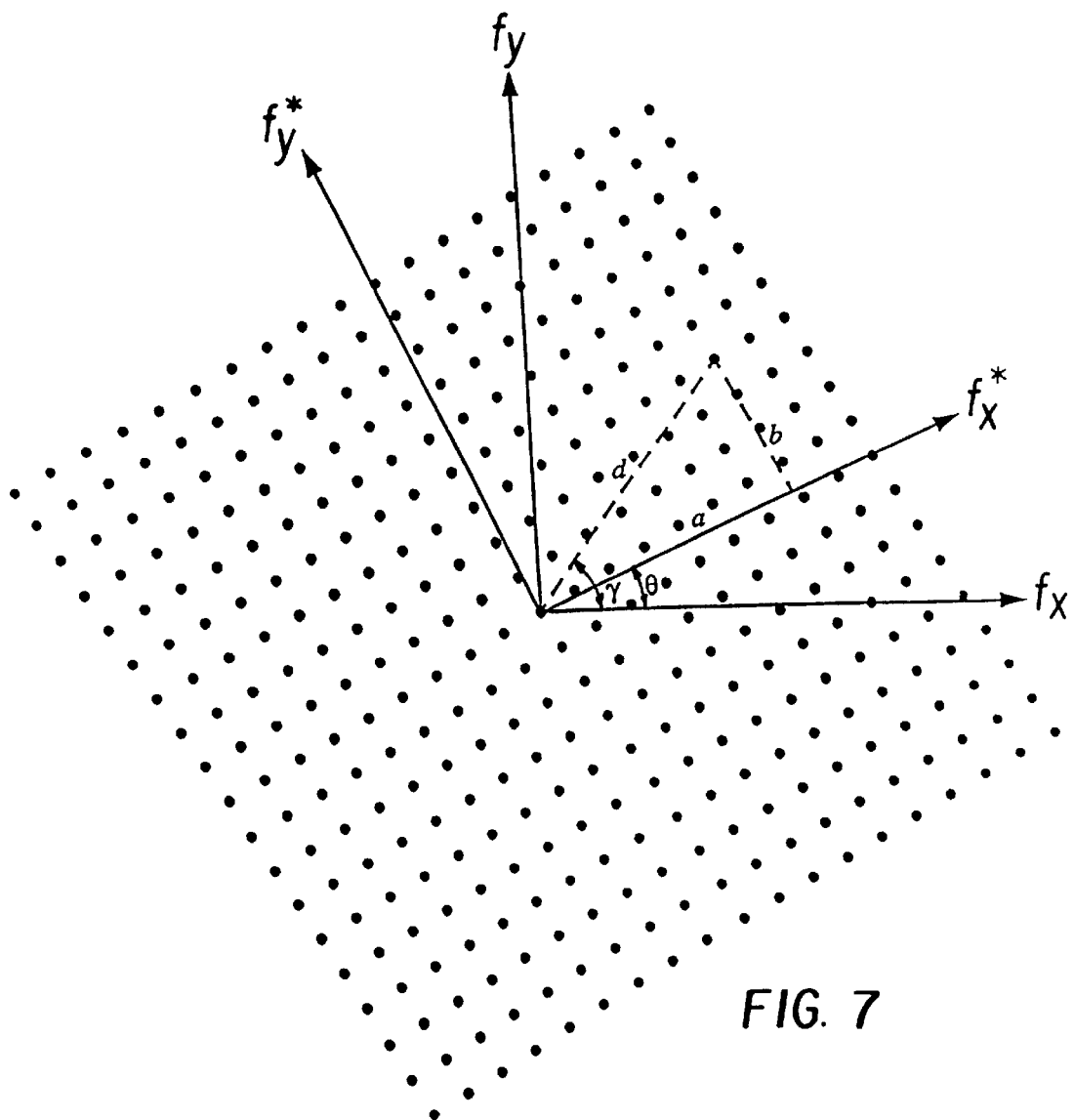
FIG. 7 represents an array of discrete spatial frequencies in the Fourier transform.

For steps 41 and 42 it was necessary to design a transform which accumulates evidence for a rectangular grid with scale and orientation as parameters. FIG. 7 shows a grid in frequency space where each dot represents a frequency in the discrete Fourier transform. The coordinate system with axes labeled $f_x$ and $f_y$ correspond to the horizontal and vertical directions of the digital image, respectively. The coordinate system with axes labeled $f_x^*$ and $f_y^*$ is rotated counter-clockwise by an angle θ. We refer to this coordinate system as the * coordinate system.

Consider a line between the origin and a point in the frequency space at position $(f_x,f_y)$. The length of the line, d, is given by $$d=\{f_x^2+f_y^2\}^{1/2} \qquad \text{Equation (7)}$$

The line is at an angle, γ, with respect to the $f_x$ axis given by $$\gamma=a\ \cos(f_x/d) \qquad \text{Equation (8)}$$

We now calculate the projection of the line onto the $f_x^*$ and $f_y^*$ axes. Consider a set of angles $$\theta_i=i\Delta\theta+\theta_{min}$$

$$0\leq i\leq(\theta_{max}-\theta_{min})/\Delta\theta \qquad \text{Equation (9)}$$

where i is an integer and Δθ is the resolution with which the θ is to be determined. The projection onto the $f_x^*$ axis is $$a = d\cos(\gamma - \theta_i) \quad \text{Equation (10)}$$

and onto the $f_y^*$ axis is $$b = d\sin(\gamma - \theta_i) \quad \text{Equation (11)}$$

The grid in the spatial domain is assumed to be rectangular with a nominal horizontal period $p_x$ and vertical period $p_y$. The value of $p_x$ and $p_y$ may vary independently in proportion to the scale factors $Sx_j$ and $Sy_j$, respectively. These scale factors are given by $$S_{xj} = j\Delta S + S_{min}$$

$$S_{yk} = k\Delta S + S_{min}$$

$$0 \leq j, k \leq (S_{max} - S_{min})/\Delta S \quad \text{Equation (12)}$$

where j and k are integers and $\Delta S$ is the resolution with which the scale is to be determined.

For all combinations of values of the two scale factors a fundamental frequency is calculated as follows $$f_{x0} = N/(S_{xj}p_x)$$

$$f_{y0} = M/(S_{yk}p_y) \quad \text{Equation (13)}$$

The points in the grid in frequency space represent harmonics of the fundamental frequency of the grid. For any point $(f_x, f_y)$ in frequency space we ask the question: If the point belongs to a grid that is aligned with the * coordinate system, what harmonic does it belong to? If the point is indeed a harmonic, then the best guess of its order $m_x$ and $m_y$ are $$m_x = \text{Nint}(a/f_{x0})$$

$$m_y = \text{Nint}(b/f_{y0}) \quad \text{Equation (14)}$$

The differences between the projections of a point onto the axes of the * coordinate system and the projection of a point in the frequency space grid that exactly corresponds to the frequency of order $(m_x, m_y)$ are $$\Delta_x = \|f_{x0}m_x - a\|$$

$$\Delta_y = \|f_{x0}m_x - b\| \quad \text{Equation (15)}$$

We conclude that the point actually belongs to a grid if $$\Delta_x \leq Q \text{ and } \Delta_y \leq Q \quad \text{Equation (16)}$$

where Q is a constant. In practice, Q is set to 0.75 to allow for sampling error.

When a point in frequency space is classified in step 51 as belonging to a grid with orientation $\theta_i$ and scales $Sx_j$ and $Sy_j$, the power at that frequency is added to a matrix which accumulates evidence of the existence of a grid at orientation angle $\theta_i$ and scales $Sx_j$ and $Sy_j$ as follows $$E(\theta_i, S_{xj}, S_{yk}) = E(\theta_i, S_{xj}, S_{yk}) + \frac{\|H(f_x, f_y)\|^2}{P_{total}} \quad \text{Equation (17)}$$

where $\|(f_x, f_y)\|^2$ is the power at frequency $f_x$ and $f_y$ and $P_{total}$ is the total power in the discrete Fourier transform within the frequency range of interest. Due to symmetry we need only consider on-half of the frequency plane. Also, we do not include frequencies with a DC component because the power at these frequencies is largely due to boundary effects. We exclude the frequency axes ($f_x$ or $f_y = 0$) because those frequencies contain power simply due to the non-periodic nature of the Y-image. Finally, since the Fourier transform of a set of real numbers has inversion symmetry about the origin it is only necessary to include frequencies with positive values of $f_y$.

Because of the thresholding and cut-out of the power-spectrum, as described above, only frequencies with a high amount of power in them will contribute to E. The number of frequencies that contribute to E for indices i, j, and k is a very important quantity and is denoted by $\beta_{ijk}$.

It is prudent to place a limit on the amount of power that a single frequency may contribute to E in order to avoid false positives. The value of $\|H(f_x, f_y)\|$ in Equation (17) is limited according to $$\|H(f_x, f_y)\| = \text{Min}(\|H(f_x, f_y)\|, H_{max}) \quad \text{Equation (18)}$$

The final metric is based on the maximum value of E that was determined over the range of orientation and scales for which E was calculated. This metric is given by $$\Psi = \frac{100E(\theta_i, S_{xj}, S_{yk})_{max}}{K} \quad \text{Equation (19)}$$

where K is 0.73. When the Y-image used in the calculation of $\Psi$ is as computed using Equation (1) we denote the metric by $\Psi_b$. We next determine in step 52 the value of $\beta_{ijk}$, simply denoted by $\beta$, corresponding to the orientation and scales at which the maximum value of $\Psi_b$ occurs.

The number of frequencies that contributed to $\Psi_b$ we denote by $\beta_b$. The metric $\beta_b$ is used to ensure that a high value of $\Psi_b$ is the result of a grid of frequencies with high power that have a separation characteristic of the grid of minus-yellow microdots.

In step 53, for a print to be classified as copy-restricted, $\Psi_b$ must equal or exceed a threshold $\Psi_{thres}$ as indicated by the following equation:

$$\Psi_b \geq \Psi_{thres} = 20 \quad \text{Equation (20)}$$

Simultaneously, the number of frequencies that contributed to the metric must be in the range given by:

$$\beta_{min} = 50 \leq \beta_b \leq 250 = \beta_{max} \quad \text{Equation (21)}$$

This condition ensures that the periodic feature of the print which is contributing to $\Psi_b$ is of the proper frequency.

The threshold for $\Psi$ and the permitted range of $\beta_b$ are chosen so that prints with the microdots will be classified as copy-restricted in step 54 and prints without the microdots are classified as not copy-restricted in step 55.

The values chosen for the various parameters described above are:

| | | |
|---|---|---|
| $M = 256$ | $N = 256$ | |
| $L = 2$ | $C = 7.0$ | |
| $p_x = 25.1$ | $p_y = 25.1$ | |
| $S_{min} = 0.98$ | $S_{max} = 1.02$ | $\Delta S = 0.005$ |
| $\theta_{min} = 0.00°$ | $\theta_{max} = 90.0°$ | $\Delta\theta = 0.50°$ |
| $Q = 0.75$ | $K = 0.73$ | |
| $T_{min} = 0.06$ | $f_{cutout} = 5$ | $H_{max} = 0.76$ |
| $\Psi_{thres} = 20.0$ | $\beta_{min} = 50$ | $\beta_{max} = 250$ |

Prints of the Heirloom Scene described previously with minus-yellow microdots exposed at 7", 10", and 14" were scanned (step 40) and then the digital image was processed starting at step 41 and proceeding to step 43. The values of $\Psi_b$ and $\beta_b$ were, respectively, 124 and 113 for the 7"

exposure, 127 and 100 for the 10" exposure, and 112 and 99 for the 14" exposure. For the print of the Heirloom Scene that did not contain minus-yellow microdots the values were 34.5 and 4, respectively. Therefore, according to Equations (20) and (21) the prints with minus-yellow microdots were correctly classified as copy-restricted and the print without microdots was correctly classified as not being copy-restricted.

Example 2

Example 2 is a description of the results obtained when four experienced photographers were asked to examine color-reversal photographic prints that contained or did not contain minus-yellow microdots.

The 8"×10" Eastman Kodak Radiance III™ prints containing an image enlarged from the 35 mm Eastman Kodak 5005 EPP™ reversal image of Example 1 were used for the judging. In addition to prints with the minus-yellow microdots that were produced with mask exposures of 7", 10", and 14", there was one print without microdots and one print with microdots exposed at 30". The latter print had easily visible minus-yellow microdots and was used for training the judges as to what to look for and inform them that there were no microdots in the highlight areas of the scene. The judges were asked to rate each print according to the microdots being either visible, barely perceptible, or invisible. The prints were selected for viewing in random order with respect to microdot exposure time and no limitation was placed on viewing distance. The ceiling lighting was fluorescent using a bank of Sylvania Cool White Deluxe™ 40 Watt lamps that provided a bright viewing condition typical of a viewing booth used by professional photographers.

| | JUDGING RESULTS: | | |
|---|---|---|---|
| Judge 1: X | Judge 2: O | Judge 3: + | Judge 4: * |
| Microdot Exposure | Visible | Barely Perceptible | Invisible |
| None | | | X O + * |
| 7 | | + | X O * |
| 10 | | X + | O * |
| 14 | | X + * | O |

The result of this judging is that none of the four judges saw visible microdots of any color in any of the prints. All prints with microdot were determined to be copy-restrictive when opto-electronically scanned and processed through the algorithm described in Example 1. The detection signal generated by the algorithm was employed to inhibit the operation of the printer 30. Furthermore, the print without microdots was determined to not be copy-restrictive and the printer 30 was enabled.

The invention has been described with reference to preferred embodiments. However, it will be appreciated that variations and modifications can be effected by a person of ordinary skill in the art without departing from the scope of the invention.

PARTS LIST:
10 original document
12 image
14 window
16 microdots
20 copy print station
22 scanner
24 computer
26 keyboard
28 monitor
30 printer
40 step, scan the print
41 step, determine the best section of the image to process
42 step, resize the best section image
43 step, actual r, g, b values
44 step, scene r, g, b values
45 step, 3D LUT
46 step, Dot b value
47 step, determine a Y value for the pixel
48 step, apply morphological filter to the Y-image
49 step, calculate the power spectrum of the Y-image
50 step, threshold and remove low frequency content from the power spectrum
51 step, calculate $\Psi_b$ and $\beta_b$ for grids over a range of orientations and scales
52 step, determine the grid and associated orientation and scale with the highest value of $\Psi_b$
53 question, are $\Psi_b$ and $\beta_b$ within the range expected for a print with a grid of microdots?
54 step, print classified as copy-restricted
55 step, print is not copy-restricted

What is claimed is:

1. A system for restricting the copying of a color-reversal document comprising:

means for embedding one or more microdots into a color-reversal document;

detecting means for detecting the presence of one or more of the microdots in said color-reversal document; and controlling means responsive to said detecting means for restricting a copy machine from copying the color-reversal document when a microdot is detected.

2. The system according to claim 1, wherein said detecting means detects the presence of one or more microdots in the color-reversal document based on one or more characteristics of color, color shift, optical density, size, shape, profile, orientation, geometrical arrangement, or spacing.

3. The system according to claim 1, wherein said microdots have a spectral character of low visual perceptibility.

4. The system according to claim 1, wherein the microdots are minus-yellow in hue when viewed against a yellow background and blue in hue when viewed against a neutral gray background.

5. The system according to claim 4, wherein the equivalent circular diameter of the microdots is 300 microns or less with the edge of a microdot defined by the isodensity profile at which the yellow optical density is midway between the minimum density of the microdot and the density of the region adjacent to the microdot.

6. The system according to claim 1, wherein the spatial arrangement of the microdots is periodic with one or more periodicities.

7. The system according to claim 1, wherein the spatial arrangement of the microdots is aperiodic with one or more aperiodicities.

8. The system according to claim 1, wherein the spatial arrangement of the microdots is a combination of periodic and aperiodic.

9. The system according to claim 1, wherein the microdots comprise a unique pattern.

10. The system according to claim 1, wherein the microdots have an optical density, size, and spacing so as to not visually modify the lightness, color balance, or tone reproduction of an image in the document.

11. The system according to claim 1, wherein the microdots are absent in areas of the color-reversal document of minimal optical density.

12. The system according to claim 1, wherein the microdots are minimally spaced 0.5 mm center-to-center.

13. A method for restricting the copying of a color-reversal document comprising the steps of:
   a) embedding at least one minus-yellow microdot into a color-reversal document to be copy restricted;
   b) detecting the presence of said at least one minus-yellow microdot in the color-reversal document when a copy action is attempted; and
   c) restricting the copy action when the at least one minus-yellow microdot is detected.

14. The method according to claim 13, wherein said at least one minus-yellow microdot is selected to have a spectral character of low visual perceptibility.

15. The method according to claim 13, wherein said at least one minus-yellow microdot is minus-yellow in hue when viewed against a yellow background and blue in hue when viewed against a neutral gray background.

16. The method according to claim 13, wherein the equivalent circular diameter of said at least one minus-yellow microdot is 300 microns or less with the edge of a microdot defined by the isodensity profile at which the yellow optical density is midway between the minimum density of the microdot and the density of the region adjacent to the microdot.

17. The method according to claim 13, wherein the spatial arrangement of said at least one minus-yellow microdot is periodic with one or more periodicities.

18. The method according to claim 13, wherein the spatial arrangement of said at least one minus-yellow microdot is aperiodic with one or more aperiodicities.

19. The method according to claim 13, wherein the spatial arrangement of said at least one minus-yellow microdot is a combination of periodic and aperiodic.

20. The method according to claim 13, wherein said said at least one minus-yellow microdot comprises a unique pattern.

21. The method according to claim 13, wherein said at least one minus-yellow microdot has an optical density, size, and spacing so as to not visually modify the lightness, color balance, or tone reproduction of an image in the document.

22. The method according to claim 13, wherein said at least one minus-yellow microdot is absent in areas of the color-reversal document of minimal optical density.

23. The method according to claim 13, wherein said at least one minus-yellow microdot is minimally spaced 0.5 mm center-to-center.

24. A method for controllably enabling the copying of a color-reversal document comprising the steps of:
   a) embedding one or more microdots into a color-reversal document;
   b) detecting the presence of one or more microdots in the color-reversal document when a copy action is attempted; and
   c) enabling or disabling the copying of the color-reversal document based on the detected presence of one or more microdots.

25. A method for controllably enabling the copying of a color-reversal document comprising the steps of:
   a) embedding a plurality of microdots into a color-reversal document;
   b) scanning the color-reversal document to obtain document pixel values;
   c) defining at least one metric that indicates the presence of microdots in the color-reversal document;
   d) comparing the value of at least one metric to a predetermined value or range of values to determine the presence of microdots; and
   e) authorizing the copying based on the determined presence or absence of microdots.

26. A method for controllably enabling the copying of a color-reversal document comprising the steps of:
   a) embedding at least one microdot into a color-reversal document;
   b) scanning the color-reversal document to obtain document pixel values;
   c) determining the closeness of color-reversal document pixel values to predetermined microdot values;
   d) determining the presence or the absence of at least one microdot on the color-reversal document based on the measures of closeness from step c); and
   e) authorizing the copying based on the presence or the absence of the at least one microdot.

27. A method for controllably enabling the copying of a color-reversal document comprising the steps of:
   a) embedding at least one microdot into a color-reversal document;
   b) scanning the color-reversal document to obtain document pixel values;
   c) defining a threshold and a range metric that indicates the presence of microdots in the color-reversal document;
   d) comparing the value of the threshold metric to a predetermined threshold value and simultaneously comparing the value of the range metric to a predetermined range of values; and
   e) authorizing the copying based on the presence or the absence of the at least one microdot.

28. A method for controllably enabling the copying of a color-reversal document comprising the steps of:
   a) embedding one or more microdots into a color-reversal document;
   b) detecting the presence of one or more microdots in the color-reversal document based on one or more characteristics of color, color shift, optical density, size, shape, profile, orientation, geometrical arrangement, or spacing; and
   c) enabling or disabling the copying of the color-reversal document based on the detected presence of one or more microdots.

* * * * *